(12) United States Patent
Kitamura et al.

(10) Patent No.: US 11,231,695 B2
(45) Date of Patent: Jan. 25, 2022

(54) MACHINING CENTER NC OPERATING PANEL

(71) Applicant: KITAMURA MACHINERY CO., LTD., Toyama (JP)

(72) Inventors: Akihiro Kitamura, Toyama (JP); Kosaku Kitamura, Toyama (JP); Takashi Asano, Toyama (JP)

(73) Assignee: KITAMURA MACHINERY CO., LTD., Toyama (JP)

( * ) Notice: Subject to any disclaimer, the term of this patent is extended or adjusted under 35 U.S.C. 154(b) by 74 days.

(21) Appl. No.: 16/491,782

(22) PCT Filed: Mar. 2, 2018

(86) PCT No.: PCT/JP2018/008027
§ 371 (c)(1),
(2) Date: Sep. 6, 2019

(87) PCT Pub. No.: WO2018/163992
PCT Pub. Date: Sep. 13, 2018

(65) Prior Publication Data
US 2020/0033829 A1   Jan. 30, 2020

(30) Foreign Application Priority Data

Mar. 6, 2017  (JP) .............................. JP2017-041810

(51) Int. Cl.
*G05B 19/409*  (2006.01)
*G06K 9/00*  (2006.01)

(52) U.S. Cl.
CPC ....... *G05B 19/409* (2013.01); *G06K 9/00255* (2013.01); *G06K 9/00288* (2013.01);
(Continued)

(58) Field of Classification Search
CPC ........ G05B 19/409; G05B 2219/34451; G05B 2219/35481; G06K 9/00255; G06K 9/00288
See application file for complete search history.

(56) References Cited

U.S. PATENT DOCUMENTS 5,910,988 A   6/1999  Ballard
6,032,137 A   2/2000  Ballard
(Continued)

FOREIGN PATENT DOCUMENTS

JP   2004 167669 A   6/2004
JP   2007 272486 A   10/2007
(Continued)

OTHER PUBLICATIONS

Search Report dated Sep. 10, 2019, issued in corresponding International Application No. PCT/JP2018/008027.
(Continued)

*Primary Examiner* — Ruiping Li
(74) *Attorney, Agent, or Firm* — Bacon & Thomas, PLLC

(57) ABSTRACT

A machining center NC operation panel is provided which can serve as a personal authentication system capable of simply and reliably identifying operators and implementing appropriate operational restrictions. The operation panel is provided with an imaging device mounted on its front or on a manual pulse generator for at-hand operation connected to the operation panel. In the operation panel: a storage unit stores an operator list allocated with work information prepared for each of the pre-registered operators, the work information including operations which the operators are respectively allowed to perform at a machine tool main body and restricted operations which the operators are not respectively allowed to perform, and a face image file holding a group of face image data on the operators registered in the operator list; and a control unit includes a face authentica-
(Continued)

tion processing unit which searches for and identifies an operator by checking operator face image data obtained from the imaging device against the group of face image data held in the face image file and a work information processing unit which obtains, from the operator list, work information associated with the identified operator and has, based on the obtained work information, a function of displaying work items the identified operator is allowed to perform in the display part.

5 Claims, 4 Drawing Sheets

(52) U.S. Cl.
CPC .............. *G05B 2219/34451* (2013.01); *G05B 2219/35481* (2013.01)

(56) References Cited

U.S. PATENT DOCUMENTS

| | | | |
|---|---|---|---|
| 2015/0264209 A1* | 9/2015 | Shiraishi | H04N 1/4433 358/1.15 |
| 2015/0273704 A1 | 10/2015 | Inaba et al. | |

FOREIGN PATENT DOCUMENTS

| | | |
|---|---|---|
| JP | 2007 329284 A | 12/2007 |
| JP | 2014 063423 A | 4/2014 |
| TW | 436735 B | 5/2001 |
| TW | 2012 45917 A1 | 11/2012 |
| WO | 2015 052419 A1 | 4/2015 |

OTHER PUBLICATIONS

Office Action dated Feb. 6, 2020, issued in corresponding Japanese Application No. 2017-041810.
Search Report dated Jun. 5, 2018, issued in corresponding International Application No. PCT/JP2018/008027.
Search Report dated Nov. 30, 2020, issued in corresponding European Application No. 18764592.4.
Office Action dated May 27, 2021, issued in corresponding Taiwan Application No. 10 7105493.
Office Action dated Sep. 14, 2021, issued in corresponding Canadian Application No. 3,053,748.
Office Action dated Aug. 30, 2021, issued in corresponding Taiwan Application No. 10 7105493.

\* cited by examiner

MACHINING CENTER NC OPERATING PANEL

TECHNICAL FIELD

The present invention relates to an NC operation panel to be connected to a machine tool main body of a machining center and to perform numerical control and, more particularly, relates to a machining center NC operation panel with an operator face authentication function.

BACKGROUND ART

In machining centers in use today, various machining operations can be automatically performed using various NC programs under numerical control from an operation panel with an NC function connected to the machine tool main body.

Such an operation panel with an NC function generally has a display part, e.g., a display disposed in an upper portion on the front. Around and below the display part, function keys, a CF card slot, a USB port, a keyboard including a mouse pad and mouse buttons and many and various kinds of operation-related switches, dials, keys and the like are disposed.

Also, a storage unit included in an internal control unit holds NC programs for various machining operations and tool information inputted from the operation panel. Therefore, an operator can, by calling up and executing a predetermined NC program using an NC operation panel, make an automatic machining operation performed following the NC program at the machine tool main body.

However, operators to use such an NC operation panel widely vary in level as to their work experiences, skill proficiency or qualifications, and the control functions and types of machining operations they can apply to the machine tool main body differ between them. From the viewpoint of safety and security, therefore, it is necessary to specify the ranges of operations that the operators are respectively allowed to perform. Hence, a personal identification system is required which, when machining center operation is to be started by an operator using an NC operation panel, identifies the operator so as to allow the operator to perform only work items specified as allowable for the operator.

Devices provided with systems for identifying individual operators when performing various machining operations have been proposed. They include, for example, a device which is provided with a system to identify an operator by detecting, using an identification sensor, a radio tag carried by the operator and obtaining identification information from the radio tag (see patent literature 1), or a system which causes, when an operator inputs information such as a password or an identification code, a screen associated with the operator to appear on a display of a control unit (see patent literatures 2, 3 and 4).

CITATION LIST

Patent Literature

Patent literature 1: Japanese Published Unexamined Patent Application No. 2016-156193
Patent literature 2: Japanese Published Unexamined Patent Application No. 2001-202108
Patent literature 3: Japanese Published Unexamined Patent Application No. 2007-272486
Patent literature 4: Japanese Published Unexamined Patent Application No. 2004-243472

SUMMARY OF INVENTION

Technical Problem

However, personal identification systems like existing ones which utilize external storage media such as IC tags pose risks of tags being lost, stolen or even being used by others. Also, personal identification systems making use of passwords and the like require information such as passwords or the like to be manually inputted, making operation bothersome and also making personal identification failure due to an information input error possible. Furthermore, such personal identification systems allow other persons to perform operations if such other persons can obtain required input information such as passwords. This may make such personal identification systems unable to securely implement operational restrictions.

An object of the present invention is to provide, in view of the above problems, a machining center NC operation panel with a personal authentication system capable of more reliably identifying operators in a very simple manner and implementing appropriate operational restrictions.

Solution to Problem

To achieve the above object, the machining center NC operation panel according to claim 1 is an operation panel with an NC function to be connected to a machine tool main body and to perform numerical control, and includes: a control unit which drives a machining unit included in the machine tool main body, following a predetermined program; and a storage unit to store various NC programs and tool information, and the operation panel is provided on its front with a display part and an input unit including many keys of various types. In the machining center NC operation panel:

an imaging device for capturing an operator's face image is mounted on the front of the operation panel or on a manual pulse generator for at-hand operation connected to the operation panel;

the storage unit stores an operator list allocated with work information prepared for each of the pre-registered operators, the work information including operations which the operators are respectively allowed to perform at the machine tool main body and restricted operations which the operators are not respectively allowed to perform, and a face image file holding a group of face image data on the operators registered in the operator list; and the control unit includes a face authentication processing unit to search for and identify an operator by checking operator face image data obtained from the imaging device against the group of face image data held in the face image file and a work information processing unit to obtain, from the operator list, work information associated with the operator identified by the face authentication processing unit and has, based on the obtained work information, a function of displaying work items the identified operator is allowed to perform in the display part, the control unit thereby allowing only operations selected from the operation items displayed in the display part to be performed.

According to a second aspect of the invention, the machining center NC operation panel according to the first aspect hereof, based on the work information, the work information processing unit has the function of displaying, in addition to the work items, notes on operation in the display part.

According to a third aspect of the invention, the machining center NC operation panel according to the first or the second aspect hereof, the imaging device is disposed in a frame portion faced by an operator of the display part.

Advantageous Effects of Invention

According to the machining center NC operation panel of the present invention: before an operator starts operating the machine tool main body, the operator is identified at a face authentication processing unit just by having the operator face an imaging device and obtaining a face image of the operator without requiring any bothersome operation like a manual input operation; a work information processing unit has a function of displaying, based on a work information file associated with the identified operator registered in an operator list, work items which the operator is allowed to perform in a display part; and the operator is allowed to perform only operations selected from the displayed work items. This allows restrictions on the operator to be imposed reliably in a simple manner, generating an effect to enhance machining center safety and security.

DESCRIPTION OF EMBODIMENT

Figure 1:
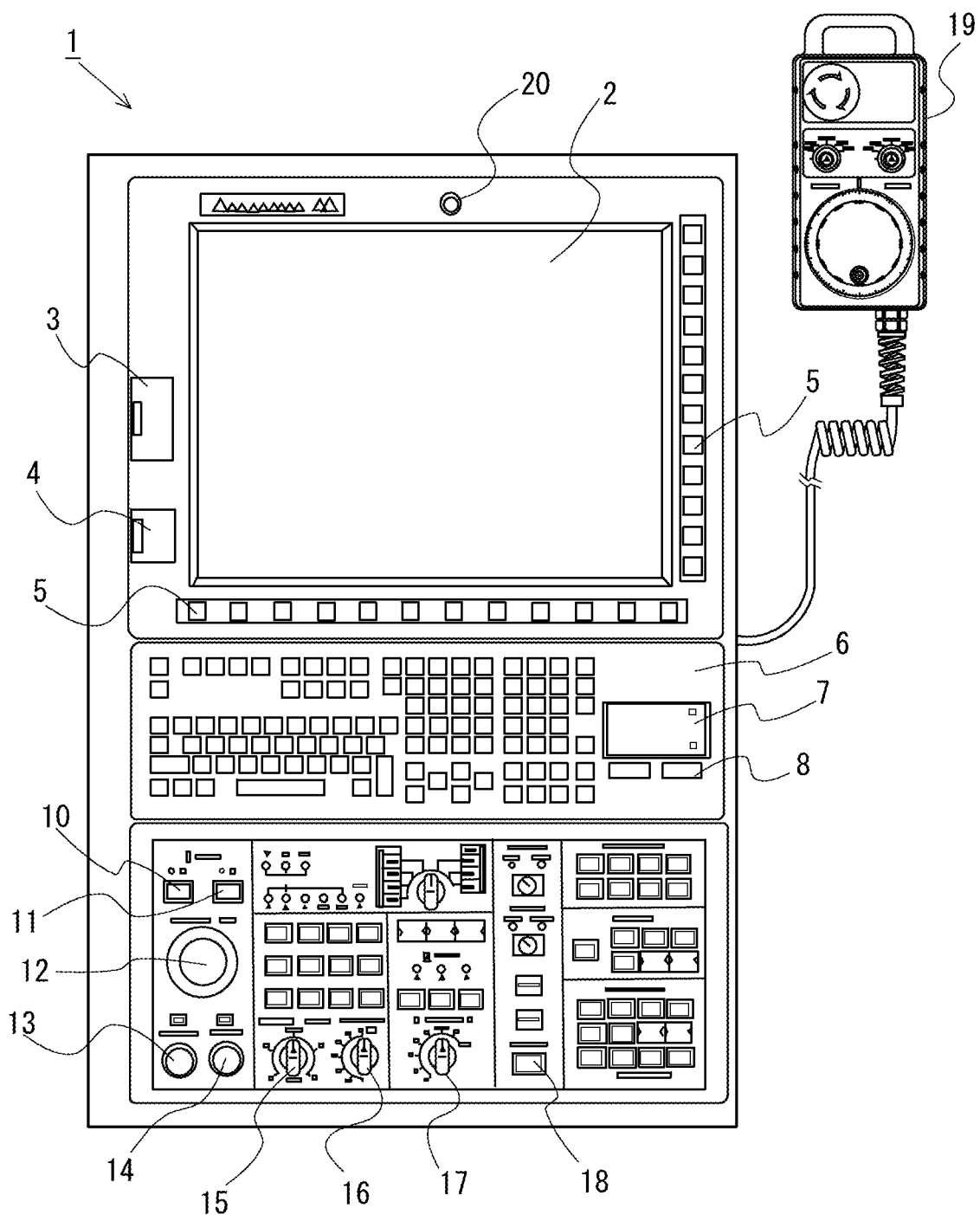
FIG. 1 is a schematic front view of a machining center NC operation panel according to an execution example of the present invention.

The present invention provides a machining center NC operation panel with an NC function to be connected to a machine tool main body and to perform numerical control. The operation panel includes: a control unit which drives, following a predetermined program, a machining unit included in the machine tool main body; and a storage unit to store various NC programs and tool information. The operation panel is provided on its front with a display part and an input unit including many keys of various types. In the machining center NC operation panel: an imaging device for capturing an operator's face image is mounted on the front of the operation panel or on a manual pulse generator for at-hand operation connected to the operation panel; the storage unit stores an operator list allocated with work information prepared for each of the pre-registered operators, the work information including operations which the operators are respectively allowed to perform at the machine tool main body and restricted operations which the operators are not respectively allowed to perform, and a face image file holding a group of face image data on the operators registered in the operator list; and the control unit includes a face authentication processing unit to search for and identify an operator by checking operator face image data obtained from the imaging device against the group of face image data held in the face image file and a work information processing unit to obtain, from the operator list, work information associated with the operator identified by the face authentication processing unit and has, based on the obtained work information, a function of displaying work items the identified operator is allowed to perform in the display part, the control unit thereby allowing only operations selected from the operation items displayed in the display part to be performed.

According to the above configuration: before an operator starts operating the machine tool main body, the operator is identified by face authentication processing just by having the operator face the imaging device and obtaining his/her face image without requiring any bothersome operation like a manual input operation; and only operations selected from work items which are displayed in the display part by performing work information processing based on the work information associated with the identified operator can be performed, so that restrictions on the operator can be simply and reliably imposed. This improves machining center safety and security.

As for the information to be displayed in the display part based on work information associated with each operator, it is desirable that not only work items allowable for the operator but also precautions for the operator, for example, machine-tool related restrictions and warnings be also displayed.

For face authentication processing, an existing face authentication program may be employed. Since the targets of face authentication processing are assumed to be a relatively limited number of personnel to use a machining center, a general, widely used type of system in which facial feature point locations such as eyes, nose and mouth edges are detected and in which detected feature point data is checked against a group of face image data is good enough. An imaging device for obtaining face images may be configured with a compact camera provided with a solid-state image sensing device similar to a CCD or a CMOS used in various terminal devices.

Images used for face authentication as described above basically represent front views of faces. According to the present invention, an imaging device is disposed on the front of an operation panel which the operator faces or on a manual pulse generator for at-hand operation which the operator holding it can arbitrarily move, so that it is easy for the operator to face his/her face to the imaging device. It is, however, more desirable to dispose the imaging device in a frame portion which is faced by the operator's face of a display part so that a good front-view image of the operator's face can be obtained just by having the operator stand in front of the operation panel. The specific vertical position of the imaging device in the frame portion may be appropriately determined based on the vertical position of the operation panel of the machining center.

EXAMPLE

Figure 2:
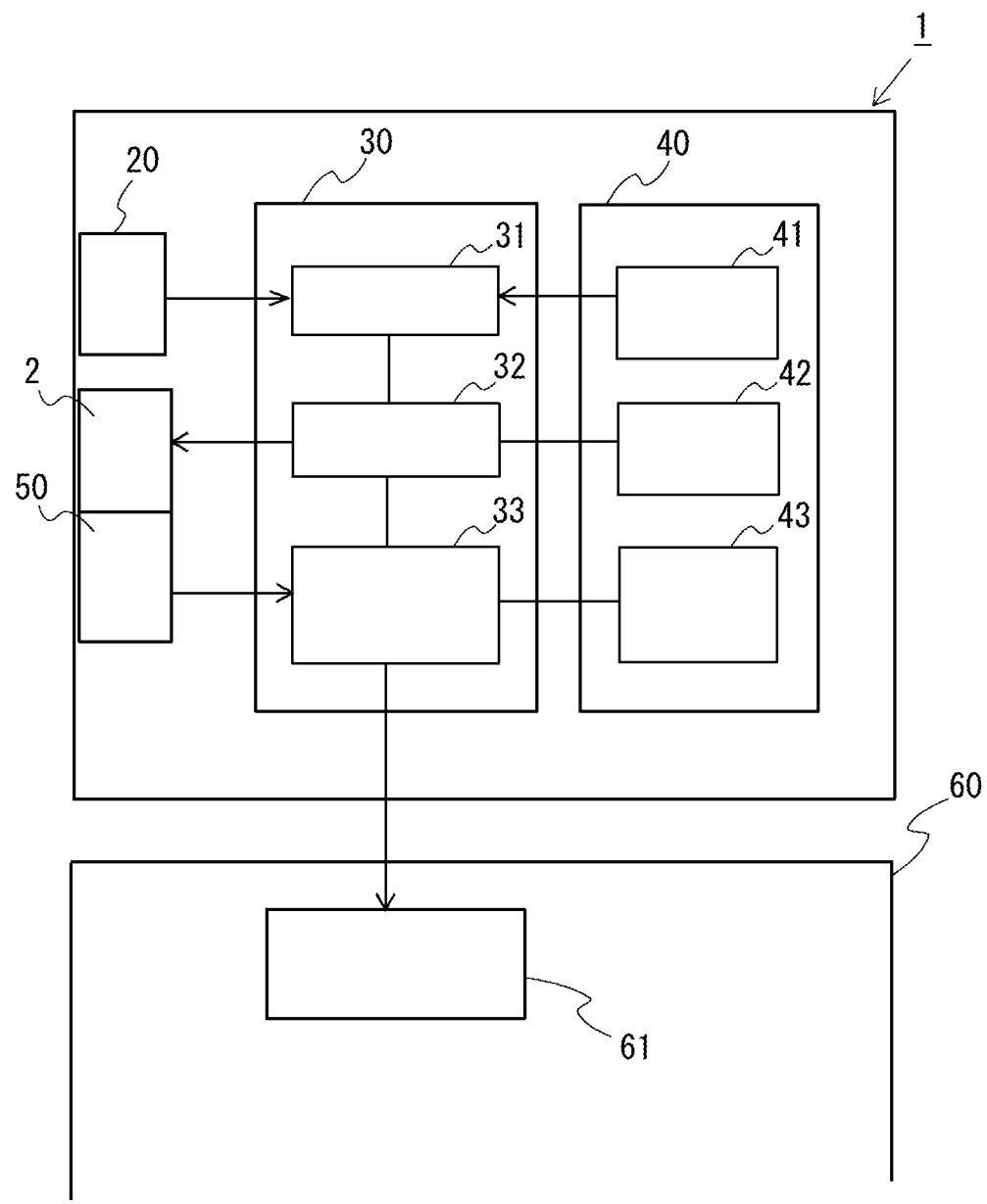
FIG. 2 is an internal conceptual view of the operation panel of FIG. 1.
Figure 3:
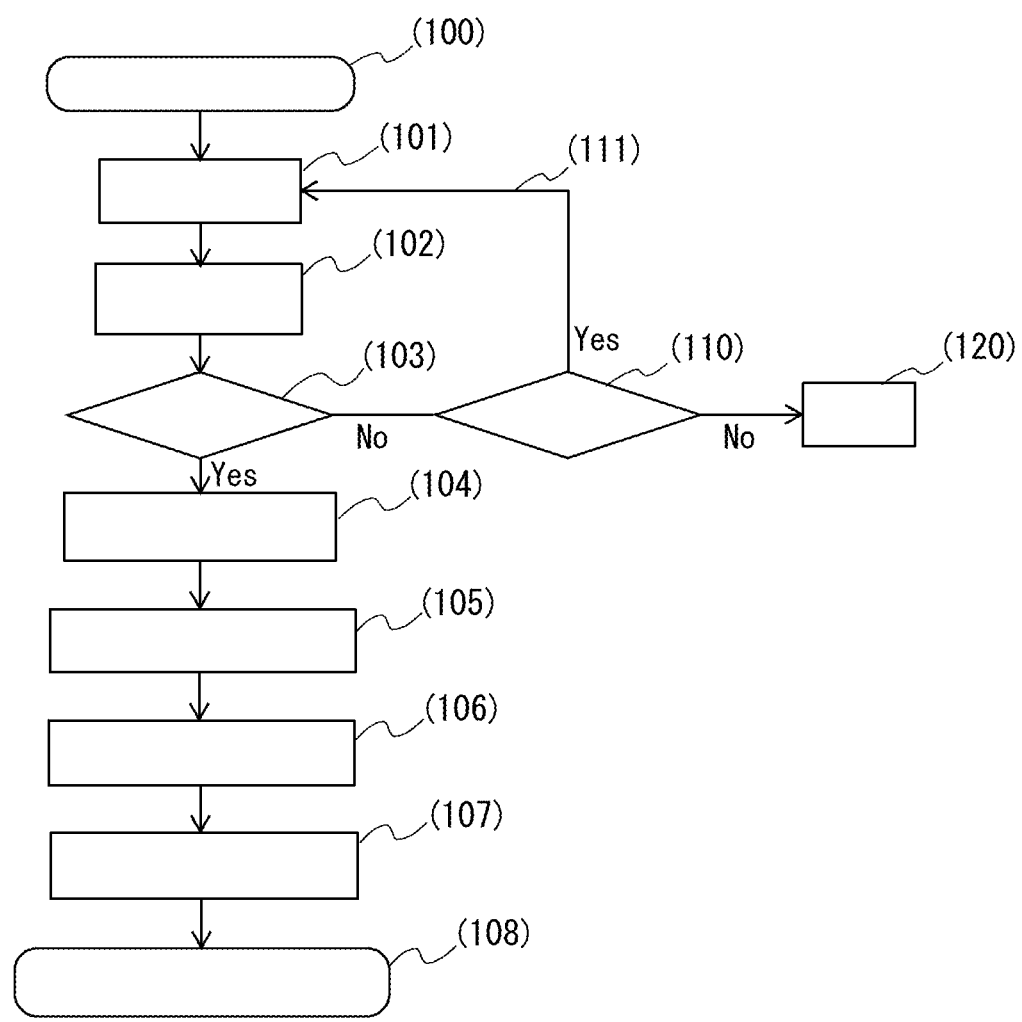
FIG. 3 is a flowchart for explaining operation of the operation panel of FIG. 1.

The machining center NC operation panel according to an execution example of the present invention is shown in FIGS. 1 and 2. FIG. 1 is a schematic front view of the present operation panel 1, and FIG. 2 is an internal conceptual view. Further, FIG. 3 is a schematic flowchart for explaining operation of the operation panel 1.

The machining center NC operation panel 1 according to the present example can make, when connected to a machine tool main body 60, a machining unit 61 perform NC program operation under numerical control. Therefore, the operation panel 1 is installed close to the machine tool main body 60. For example, it is installed adjacently to an operation window in an exterior cover surrounding the machining unit 61. In this case, it may be installed to be rotatable about a support shaft installed along one vertical side of the operation panel 1.

The basic configuration of the operation panel 1 is similar to those of existing operation panels with NC functions. Namely, a display part 2 including a liquid crystal screen is provided in an upper area of the front of the operation panel 1 with function keys 5 used to switch the screen display and to select and switch soft key menus arranged vertically and horizontally on outer peripheral parts of the display part 2. Also, a CF card slot 3 and a USB port 4 are provided to enable input and output of various data. In an area below the display part 2, a keyboard 6 including a mouse pad 7 and mouse buttons 8 is disposed.

Furthermore, in an area below the keyboard 6, various buttons, switches and the like related to operation driving are disposed. They include, for example, an operation preparation switch 10, an operation end switch 11, an emergency stop switch 12, an automatic operation start switch 13 and a feed hold switch 14. Additionally, a manual feed speed setting switch 15, a rapid feed override switch 16, a spindle speed override switch 17, an operation door interlock release button 18, and the like are also disposed.

In the present example, a CCD camera 20 is mounted as an imaging device for obtaining a face image on a center portion of an upper frame portion of the display part 2 provided on the front of the operation panel 1. In this configuration, the camera 20 images, with an operator standing facing the display part, a front view of the operator's face, and the face image data is outputted to an internal control unit 30 of the operation panel 1.

The control unit 30 drives the machining unit 61 included in the machine tool main body 60 in accordance with a predetermined program and causes NC program operation to be performed. Various programs and information about tools are stored in a program file 43 provided in a storage unit 40.

Furthermore, the storage unit 40 also stores a face image data file 41 holding a group of face image data 23 on pre-registered operators and an operator list 42 including work information associated with individual registered operators. The work information indicates operations operators are respectively allowed to perform at the machine tool main body and restrictions specifying operations the operators are not respectively allowed to perform.

Also, in the present example, the control unit 30 includes: a face authentication processing unit 31 which identifies an operator by processing face image data captured and outputted by the camera 20 and checking the processed data against the group of face image data registered in the face image data file 41; a work information processing unit 32 which obtains work information on the identified operator from the operator list 42, processes the work information and outputs the results of processing to the display part 2; and a machining operation control processing unit 33 which calls, based on the items displayed in the display part 2, a machining program specified via an input unit 50 from a program file and outputs the machining program to the machine tool main body 60.

The work information processing unit 32 is for having, based on the work information associated with the identified operator, a function of displaying work items allowed for the operator and notes on operation in the display part 2. The operator is allowed to perform operations selected from the displayed work items only, so that appropriate operational restrictions can be imposed.

The operation performed by the control unit 30 to impose operational restrictions as mentioned above follows the flowchart shown in FIG. 3. Namely, to start machining operation, the operator initially enters an operator identification mode, i.e., the initial screen of the operation panel 1 (step 100). When the operator standing in front of the display part 2 of the operation panel 1 takes an image with his/her face facing the camera 2, his/her face image is obtained (step 101).

The face image obtained is outputted to the face authentication processing unit 31 where processing including detection of face feature-point locations is performed (step 102). The processed face image data is checked against the group of face image data held in the face image data file 41 to search for matching face image data and, thereby, identifies the operator (step 103).

When the operator is identified, the work information processing unit 32 obtains, based on the results of identification, the corresponding work information from the operator list 42 (step 104), compiles performable work items and precautions and has them displayed in the display part 2 (step 105). The operator selects a machining operation to be performed from the work items displayed in the display part 2 and inputs an instruction for executing the selected work item using, for example, letter keys of the keyboard included in the input unit 50 or a touch panel on the display (step 106).

In the machining operation control processing unit 33, in accordance with an instruction from the input unit 50, a corresponding NC program is called from the program file 43 (step 107), then, the NC program is outputted to the machining unit 61 included in the machine tool main body 60, thereby, causing NC program operation to start (step 108). In the machining unit 61, machining work is performed under drive control by the program.

Figure 4A:
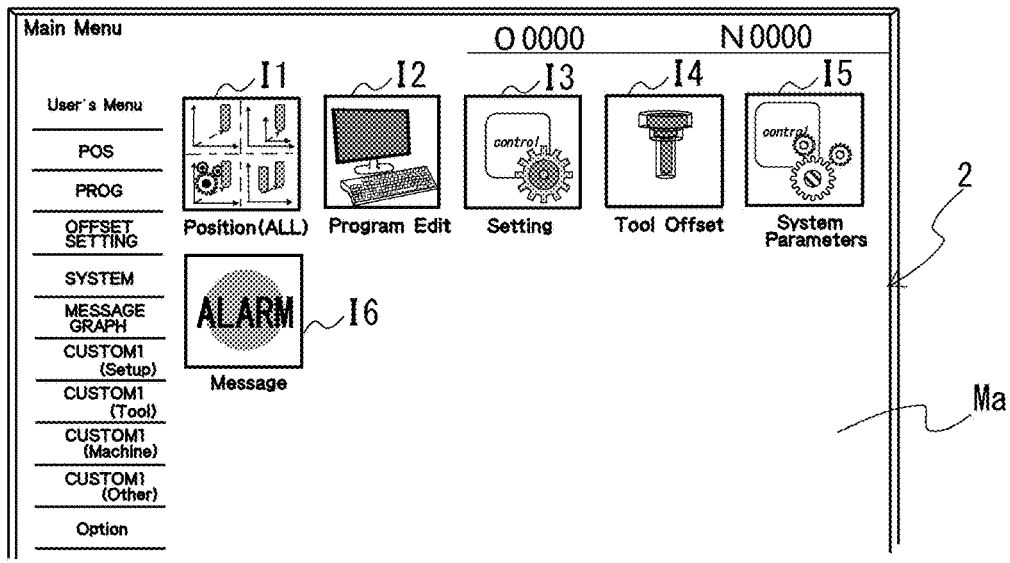
FIG. 4 shows schematic diagrams representing examples of menu screens displayed in a display part of the operation panel with FIG. 4a to FIG. 4c respectively representing menu screens to be set and displayed for different operators.
Figure 4B:
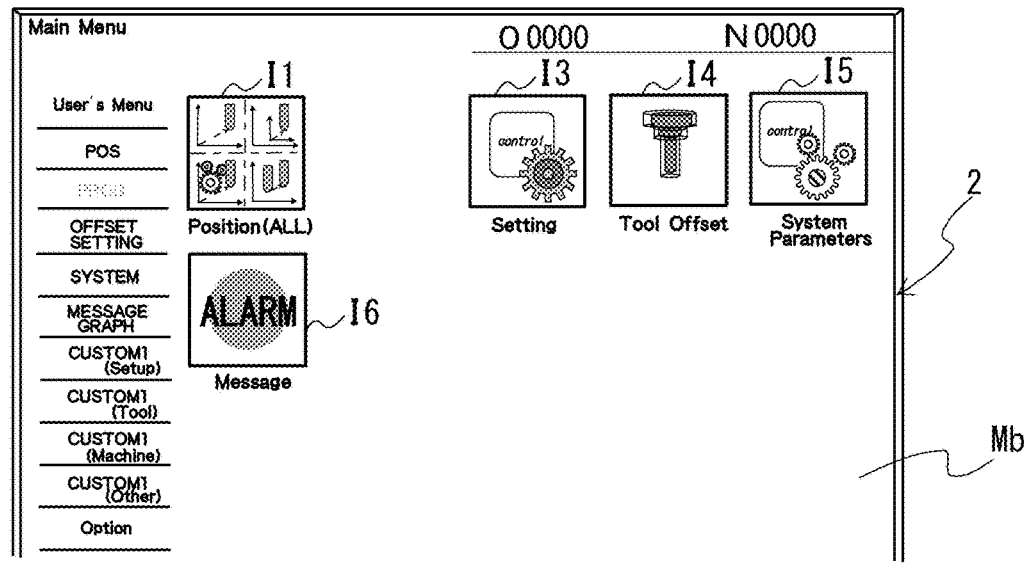
Figure 4C:
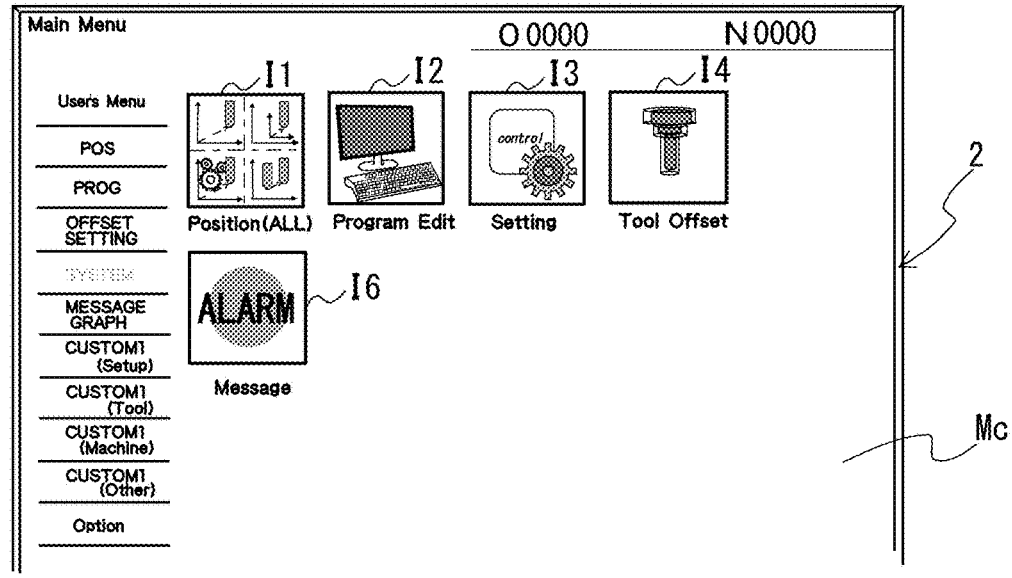

As a method of displaying only work items performable by the operator, a menu screen will be convenient which appears in the display part 2 after operator identification and which is configured, as shown in FIG. 4, to show only icons representing work items specified as selectable by the identified operator while showing no icons representing work items not selectable by the identified operator. With such a menu screen on which unselectable icons are not shown, no work items unallowable for the operator can be selected and executed.

For example, the menu screen Ma displayed, as shown in FIG. 4(*a*), for an operator with no operational restrictions imposed shows an icon for each work item, for example, a position icon I1 for a transition to a coordinate screen, a program edit icon I2 for a transition to a program edit screen, a setting icon I3 for a transition to a setting screen, a tool offset icon I4 for a transition to an offset screen, a system parameters icon I5 for a transition to a system screen and a message icon I6 for a transition to a message/tool path diagram screen. On the other hand, the menu screen Mb displayed, as shown in FIG. 4(*b*), for an operator with restrictions imposed does not show, for example, the program edit icon I2, so that the operator cannot edit programs. In the case of another operator, the menu screen Mc displayed as shown in FIG. 4(*c*) does not show, for example, the system parameter icon I5, so that the operator cannot change system parameters.

As described above, according to the present example, the operator can select and perform displayed work items only, and machine tool control operation is limited to a range allowed for the operator. This ensures high safety and security.

Note that there may be cases in which an operator's face imaged is blurred as a result of the operator moving for whatever reason at the time of imaging or in which the operator is imaged with eyes closed. In such cases, the obtained face image data may not match the pre-registered operator's face image data. This possibly causes operator identification by matching between the obtained face image data and the stored group of face image data to result in failure. Therefore, when operator identification fails, the failure is counted (step 110) and, with the failure count being within a predetermined value, the face imaging operation is performed again (step 111) to repeat the identification operation. If the operator is not identified even through the identification operation repeated a predetermined number of times, the operator is determined as not pre-registered and an operation stop mode is entered (step 120). This prevents unauthorized operation by an unregistered operator.

REFERENCE SIGNS LIST

1: Operation panel
2: Display part
3: CF card slot
4: USB port
5: Function key
6: Keyboard
7: Mouse pad
8: Mouse button
10: Operation preparation switch
11: Operation end switch
12: Emergency stop switch
13: Automatic operation start switch
14: Feed hold switch
15: Manual feed speed setting switch
16: Rapid feed override switch
17: Spindle speed override switch
18: Operation door interlock release button
19: Manual pulse generator
20: Camera (imaging device for obtaining face image)
30: Control unit
31: Face authentication processing unit
32: Work information processing unit
33: Machining operation control processing unit
40: Storage unit
41: Face image data file
42: Operator list
43: Program file
50: Input unit
60: Machine tool main body
61: Machining unit
Ma, Mb, Mc: Menu screens
I1, I2, I3, I4, I5, I6: Work item icons

The invention claimed is:

1. A machining center NC operation panel with an numerical control (NC) function to be connected to a machine tool main body and to perform numerical control, the machining center NC operation panel comprising: a control unit which drives, following a predetermined program, a machining unit included in the machine tool main body; and a storage unit to store NC programs and tool information, the operation panel being provided, on the front thereof, with a display part and an input unit including many keys of various types, wherein an imaging device for capturing an operator's face image is mounted on the front of the operation panel or on a manual pulse generator for at-hand operation connected to the operation panel, wherein the storage unit stores an operator list allocated with work information prepared for each of the pre-registered operators, the work information including operations which the operators are respectively allowed to perform at the machine tool main body and restricted operations which the operators are not respectively allowed to perform, and a face image file holding a group of face image data on the operators registered in the operator list, and wherein the control unit includes a face authentication processing unit to search for and identify an operator by checking operator face image data obtained from the imaging device against the group of face image data held in the face image file and a work information processing unit to obtain, from the operator list, work information that has been pre-allocated with the operator identified by the face authentication processing unit and the work information processing unit has a function of displaying work items the identified operator is allowed to perform in the display part based on the obtained work information, the control unit thereby allowing only operations selected from the work items displayed in the display part to be performed, each of the work items is displayed on the menu screen as an icon representing the corresponding work item, and the work information processing unit has a function, for each operator, to display only the icons representing work items allowed in advance for the identified operator on the menu screen which appears in the display part, and not display the icons representing work items that are not allowed to the identified operator on the menu screen.

2. The machining center NC operation panel according to claim 1, wherein, based on the work information, the work information processing unit has the function of displaying, in addition to the work items, notes on operation in the display part.

3. The machining center NC operation panel according to claim 1, wherein the imaging device is disposed in a frame portion faced by an operator's face of the display part.

4. The machining center NC operation panel according to claim 1, wherein, said displayed or not displayed icons contains a program edit icon for a transition to a program edit screen.

5. The machining center NC operation panel according to claim 4, wherein, said displayed or not displayed icons contains a position icon for a transition to a coordinate screen, a setting icon for a transition to a setting screen, a tool offset icon for a transition to an offset screen, a system parameters icon for a transition to a system screen and a message icon for a transition to a message/tool path diagram screen.

* * * * *